United States Patent [19]

Akahane

[11] Patent Number: 5,708,698
[45] Date of Patent: Jan. 13, 1998

[54] METHOD FOR TRIMMING AND/OR REPLACING A PORTION OF A RECEIVED VOICE MESSAGE

[75] Inventor: Masaaki Akahane, Mahwah, N.J.

[73] Assignees: Sony Corporation, Tokyo; Sony Electronics, Inc., Park Ridge, N.J.

[21] Appl. No.: 541,651

[22] Filed: Oct. 10, 1995

[51] Int. Cl.⁶ .................................................. H04M 1/64
[52] U.S. Cl. ........................................ 379/89; 379/67
[58] Field of Search ........................ 379/68, 76, 67, 379/88, 89; 395/2.79, 2.87, 2.69

[56] References Cited

U.S. PATENT DOCUMENTS

| | | | |
|---|---|---|---|
| 4,891,835 | 1/1990 | Leung | 379/88 |
| 5,008,835 | 4/1991 | Jachmann et al. | 395/2.79 |
| 5,063,698 | 11/1991 | Johnson et al. | 379/88 |
| 5,163,082 | 11/1992 | Karnowski | 379/88 |
| 5,359,698 | 10/1994 | Goldberg | 395/2.79 |
| 5,367,609 | 11/1994 | Hopper et al. | 379/84 |
| 5,483,577 | 1/1996 | Gulick | 379/88 |
| 5,485,506 | 1/1996 | Recht | 379/70 |
| 5,490,206 | 2/1996 | Stern | 379/88 |
| 5,568,540 | 10/1996 | Greco et al. | 379/88 |

*Primary Examiner*—Krista M. Zele
*Assistant Examiner*—Daniel S. Hunter
*Attorney, Agent, or Firm*—Jay H. Maioli

[57] ABSTRACT

A method and apparatus for trimming or replacing a message that has been received and stored in a solid-state memory of a wireless voice messaging unit includes playing back and marking a selected portion representing the important information in a stored message and then replacing the entire message with the selected portion, thereby increasing the available memory space for new messages. In addition, after listening to the received and stored message the user can create his own abstract of the message that is shorter than the original. The new shorter message then replaces the original message, thereby increasing the available memory space for subsequent messages.

13 Claims, 6 Drawing Sheets

METHOD FOR TRIMMING AND/OR REPLACING A PORTION OF A RECEIVED VOICE MESSAGE

BACKGROUND OF THE INVENTION

1. Field of the Invention

The present invention relates generally to a wireless voice messaging unit and, more particularly, to a method and apparatus for recording messages in an efficient fashion using a solid state memory in the wireless voice messaging unit.

2. Description of Background

Remote wireless voice messaging units are now becoming well-known and such units are typically called pagers. Such pagers usually include a solid-state memory that can store incoming messages in the order in which they are received. As semiconductor technology advances, the capacity of these memories can be made larger and larger, yet still retain their small physical size. Nevertheless, it is frequently the case that even though a memory capacity may be as large as economically feasible, the storage space for messages in the pager still fills up before the user can deal with the various messages that have been received.

On the other hand, when the user monitors or plays back the received stored messages, it is usually necessary to make hard copy notations of the desired messages in the event the user wishes to erase the memory to make room for more incoming messages.

OBJECTS AND SUMMARY OF THE INVENTION

Accordingly, it is an object of the present invention to provide a method and apparatus for efficiently storing voice messages at a wireless voice messaging unit that can eliminate the above-noted defects inherent in the previously proposed systems.

Another object of this invention is to provide a method and apparatus whereby a user of the wireless voice messaging unit can review received and stored messages and condense the messages for subsequent storage, thereby making the previously occupied memory storage space available for new messages. The condensed message then replaces the original message.

Another object of the present invention is to provide a method and apparatus so that the received, stored messages can be reviewed by playing back the messages, and the user can record new, more compressed messages by abstracting the important information contained in the original message. The new message then replaces the original message.

In accordance with an aspect of the present invention, a method and apparatus for trimming messages that have been received and stored in the solid-state memory of a wireless voice messaging unit is provided, thereby the user can mark beginning and end points of message portions to be saved upon reviewing the stored messages. Thereafter, the original message can be replaced by only the important portion as marked by the user, thereby providing more memory space to accommodate new incoming messages to be stored.

In accordance with another aspect of the present invention, a wireless voice messaging unit that has received and stored messages is provided wherein after the user has listened to a stored message, the user can replace the stored message with a shorter abstract of that stored message reflecting only the important features of that message, with the original message then being eliminated and replaced by the new, more concise message created by the user.

The above and other objects, features, and advantages of the present invention will become apparent from the following detailed description of illustrative embodiments thereof to be read in conjunction with the accompanying drawings, in which like reference numerals represent the same or similar elements.

DETAILED DESCRIPTION OF PREFERRED EMBODIMENTS

Figure 1A:
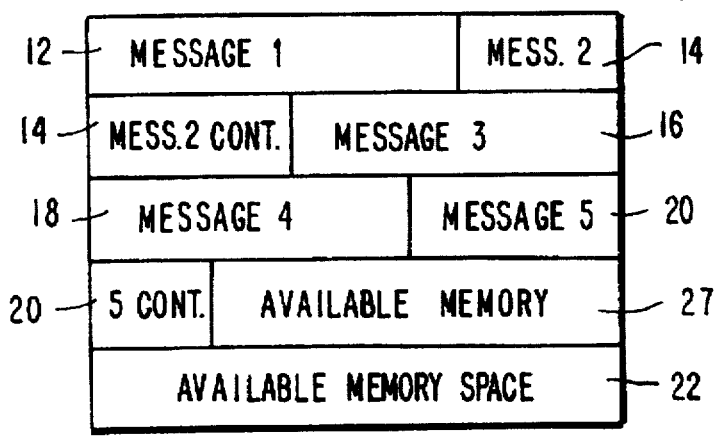
FIGS. 1A, 1B, and 1C are pictorial representations of a solid-state memory undergoing message trimming according to an embodiment of the present invention.

According to one embodiment of this invention, it is possible to perform an available memory expanding function by trimming received and stored voice messages in a wireless voice messaging unit. FIG. 1A represents a memory space of a solid-state memory having five messages already received and stored therein. The rectangular area 10 represents a solid-state semiconductor memory that has a capacity equal to the area shown thereof. It being understood, of course, that the solid-state memory does not consist of a memory area but, rather, includes a number of semiconductor junctions that are distributed in an array on a substrate. Nevertheless, for purposes of illustration, the solid state memory 10 shown in FIG. 1A already has stored therein message 1 in area 12, message 2 in area 14, message 3 in area 16, message 4 in area 18, and message 5 in area 20. The remaining available message space in memory 10 is shown generally at 22. Thus, FIG. 1A represents the solid-state memory present in a wireless voice messaging unit after five separate messages have been received and stored.

According to an embodiment of the present invention, editing of these five messages is possible by the user playing back and listening to the recorded message, then marking a beginning point and an end point of the portion to be saved for each message. Typically, messages consist of much more detail than is actually required to convey the necessary information. For example, the incoming caller not only identifies himself but may state his location or the time of the message or other incidental details that are not considered critical. The user then listens to the recorded message and makes marks in the message that indicate the location of the important information to be saved.

Figure 1B:
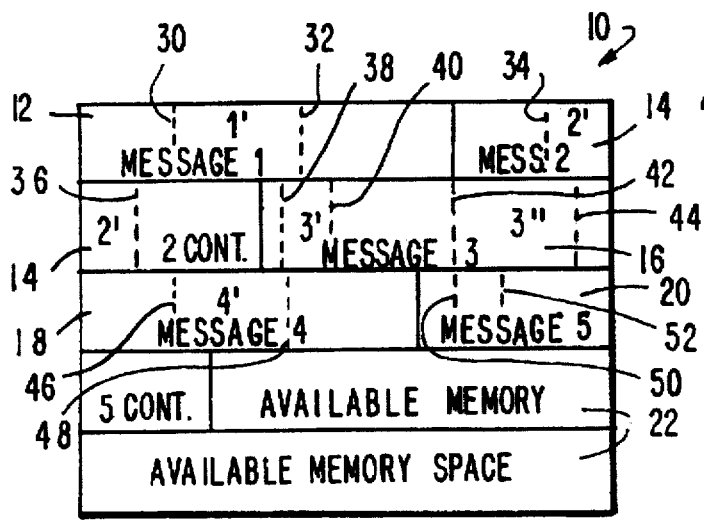

In FIG. 1B, for example, in message 1 at area 12, the beginning edit mark is made at 30 and an ending message mark is made at 32, thereby defining a new message 1'. Similarly, message 2 can be marked with a beginning mark 34 and an ending mark 36 resulting in the trimmed message 2'. The present invention contemplates that beginning and ending marks may be made at more than one place in a single message and, in the case of message 3 recorded at area 16 of memory 10, a beginning mark 38 is provided along with an ending mark 40 resulting in the trimmed message 3'. In this example, additional information is desired to be retained from the original message 3 and a second beginning mark 42 and second ending mark 44 is provided in message 3 resulting in the second trimmed message 3". In keeping with the above procedure, message 4 can be made into message 4' by beginning and ending marks 46 and 48, respectively, and message 5 can be truncated into message 5' with respective beginning and ending marks 50 and 52. Because this is a solid-state memory, these marks are made by setting so-called flags at the appropriate addresses in the well-known manner.

Now, in order to increase the amount of space available for additional incoming messages following the message trimming operation described above, only the trimmed message portions will be retained and used to replace the original respective messages. Thus, in FIG. 1C, only messages 1', 2', 3', 3", 4', and 5' will be retained in memory 10. It can be seen then that the available message space 22 is much larger after the trimmed messages have replaced the originally received and stored messages that were shown in FIG. 1A.

Figure 1C:
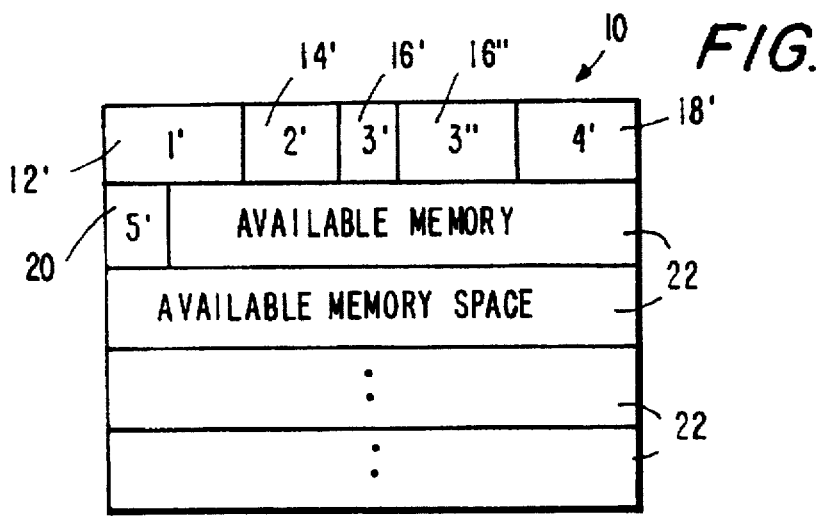
Figure 2A:
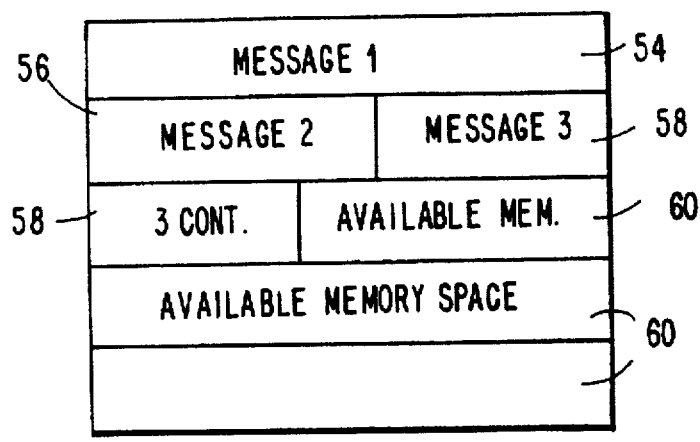
FIGS. 2A, 2B, and 2C are pictorial representations of a solid-state memory undergoing message replacement according to another embodiment of the present invention.
Figure 2B:
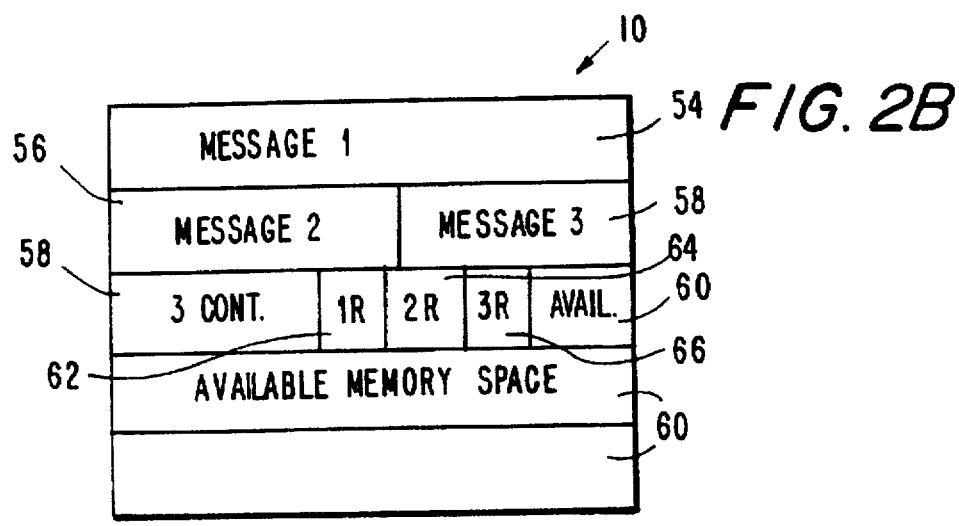
Figure 2C:
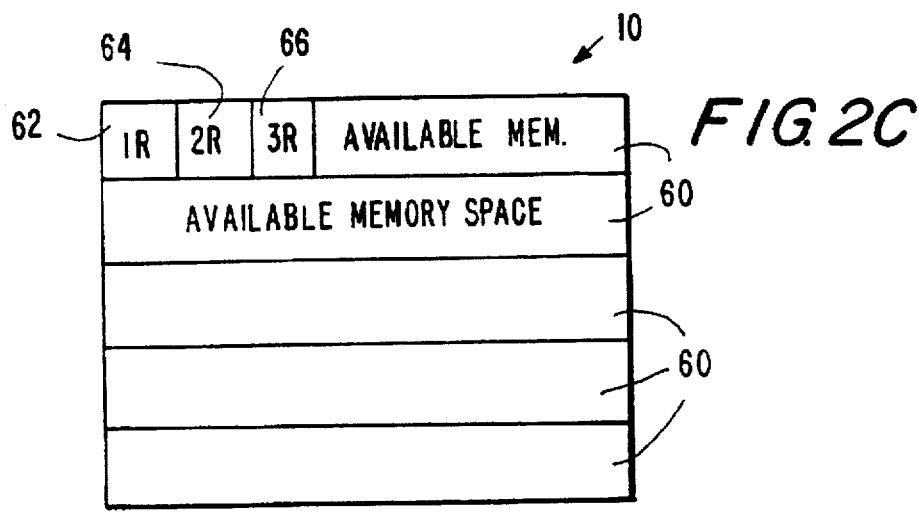

According to another embodiment of the present invention, rather than trimming the received and stored messages as described in relation to FIGS. 1A-1C above, the present invention contemplates replacing the stored voice messages with a user-generated abstract of the original message. In other words, the user synthesizes a new message formed of only the essential information contained originally in the message. FIG. 2A shows memory 10 having received and stored therein message 1 at area 54, message 2 at area 52, and message 3 at area 54, with the remainder of the memory being available for incoming messages indicated generally at 60. The user of the wireless voice messaging unit then listens to the recorded messages and provides an abstract or replacement message for each stored message. For example, as shown in FIG. 2B, a replacement message 1R is provided at area 62, a replacement message 2R is provided at area 64, and a replacement message 3R is provided at area 66. Because the object of this embodiment is to prevent the message or storage space in the solid-state memory from filling up, the abstract or replacement message will usually be substantially shorter than the original message, which typically contains redundant or irrelevant information. Thus, once the original messages have been listened to and abstracted they may be erased and replaced with the replacement messages, as represented in FIG. 2C. It will be seen from FIG. 2C that much more available message space 60 is provided by using the replacement messages 1R, 2R, 3R.

FIG. 2C shows the replacement messages 1R, 2R, 3R being moved chronologically to new areas, however, because this memory 10 is a solid-state memory, the replacement messages need not be moved at all, since all of the memory area is accessible with equal ease.

Figure 3:
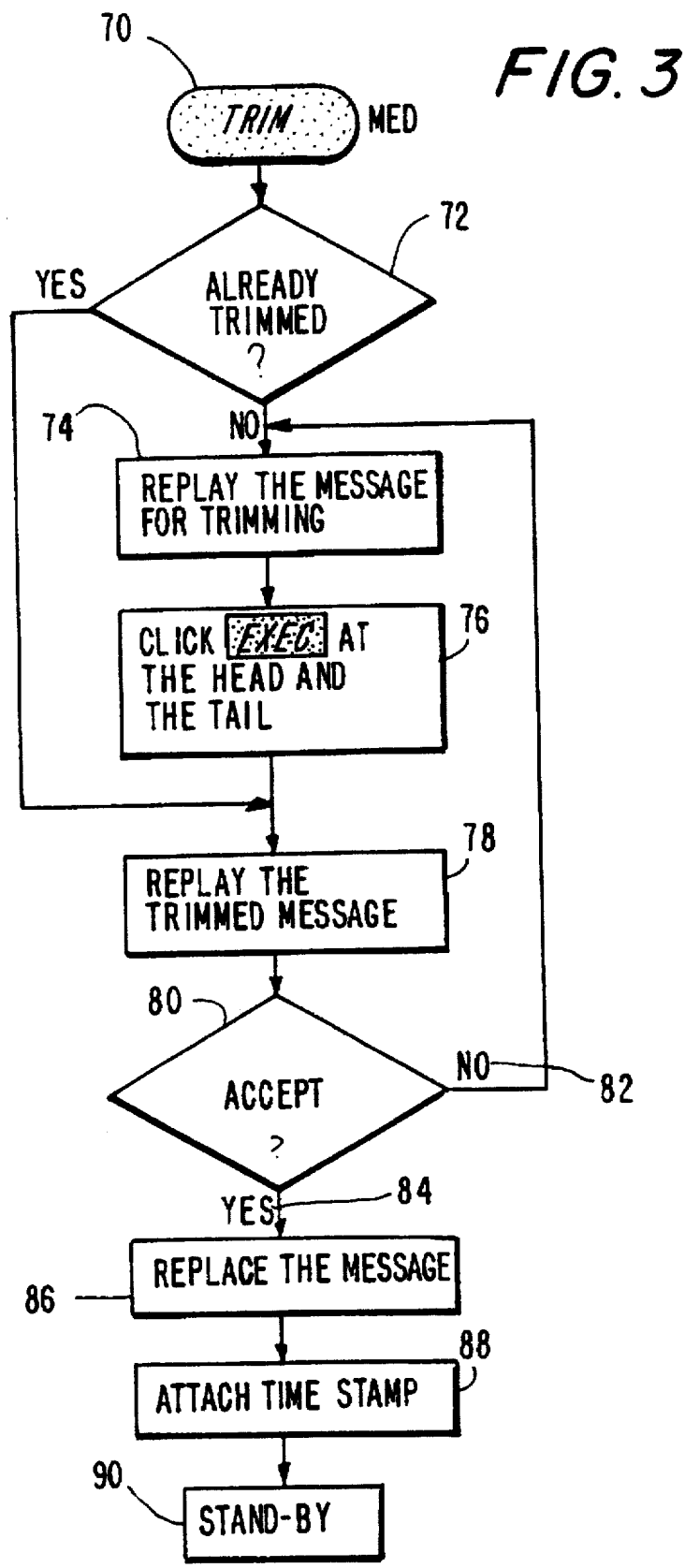
FIG. 3 is a flowchart of operations to be had in performing the message trimming operation according to the message trimming embodiment of the present invention.

FIG. 3 represents the method steps to be performed when operating according to the first embodiment of the present invention, as described in relation to FIGS. 1A-1C. That embodiment corresponds to the trimming embodiment and, in that regard, the apparatus shown in FIG. 6 and described hereinbelow includes a trim switch or button 70 that may be actuated by the user when the message trimming operation is to take place. At that time, it is determined in step 72 whether the message trimming operation has already taken place and, if not, the message is replayed for audition by the user as represented in step 74. During such replay, the user can operate an execute button EXEC as indicated in step 76 to identify the head and tail of the message portion to be retained, thereby providing the beginning and end boundary indicators as represented, for example, at 30 and 32 in FIG. 1B relative to message 1, which boundaries then define new trimmed message 1'. Next, in step 78 that new trimmed message 1' is replayed and the user then has the opportunity to either accept or reject the trimmed message, as represented in step 80. In the event that the trimmed message is rejected, a NO button 82 is pressed and the method and returns to the replay of the original message for trimming, assuming that the user did not like the manner in which he or she had originally trimmed the message. On the other hand, if the trimmed message is acceptable to the user, a YES button 84 is pressed and the next step is the replacement of the original message 1 with the trimmed message 1', as represented by step 86. An additional feature of this embodiment might be the attachment of a time code indicating the actual time at which the trim operation took place and as represented in step 88 and at the conclusion of the trim operation, the system is placed back into the standby mode 90 waiting for additional messages to be received and stored in the expanded message-available space.

As explained hereinabove relative to FIGS. 1A-1C, the replacement of the message by the trimmed message provides an increased amount of available memory space for the next incoming message. Nevertheless, the trimmed messages do not have to be rearranged as shown in FIG. 1C, since the solid-state memory is randomly accessible and need not be thought of as being a continuous space with a number of contiguous messages.

Figure 4:
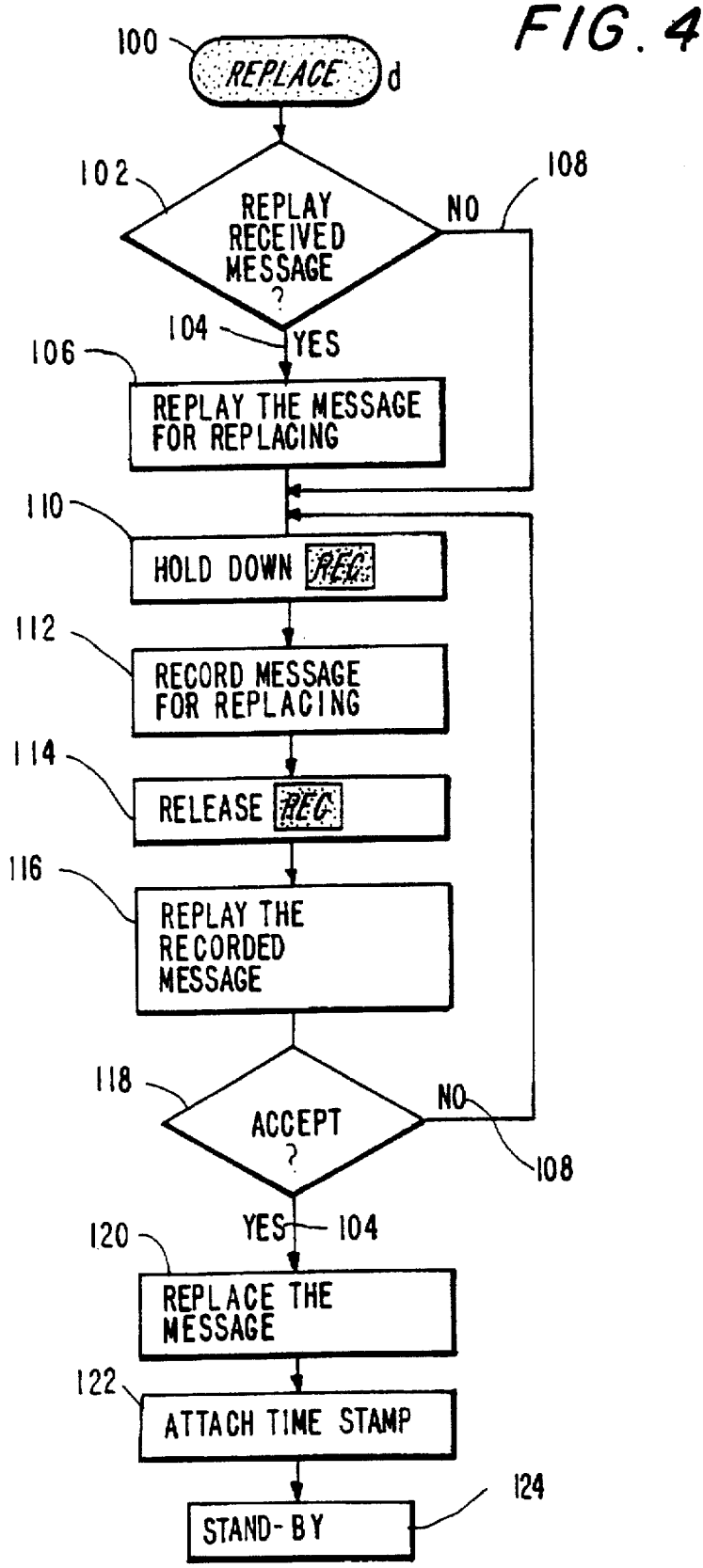
FIG. 4 is a flowchart of operations to be had in performing the message replacement operation according to the message replacement embodiment of the present invention.

FIG. 4 represents steps to be performed relative to the other embodiment of the present invention in the message replacement mode, as described relative to FIGS. 2A-2C. In order to commence the replacement mode, a message replace switch 100 is pressed by the user and at step 102 the user determines whether he wishes to replay the received message. If so, a YES button 104 is pressed and a message for replacing is replayed as represented at step 104. On the other hand, if the user remembers the message being replaced a NO button 108 can be pressed and the holding down of the record button, represented at step 110, permits the user to record a new message in shorter form than the original message that was received and stored. That replacement message recording operation is represented in step 112, and at the end of the recording operation the record button REC is released by the user as shown in 114. At that time, in order to permit the user to review the abstracted replacement message that he or she has recorded, the replacement message is then replayed as shown at step 116. Following the replay of the recorded message, the user is permitted to determine whether to accept or reject his newly recorded message as shown at step 118. In the event that the message is not acceptable, the user presses the NO button 108 and the system reverts to the situation where the user could once again record a different message. On the other hand, if the recorded message is acceptable the user presses the YES button 104 and the original message is replaced by the newly recorded message as represented at 120. Thus, the replacing of the original message corresponds to the operations that take place relative to FIGS. 2B and 2C, that is, the original message 1 is replaced by the replacement message 1R, for example. The additional feature of providing a time stamp to indicate the time of the message replacement is shown at step 122 and, thereafter, the system reverts to the standby mode as represented at step 124, whereby new incoming messages can be received and stored in the memory, which now has increased available space.

Figure 5:
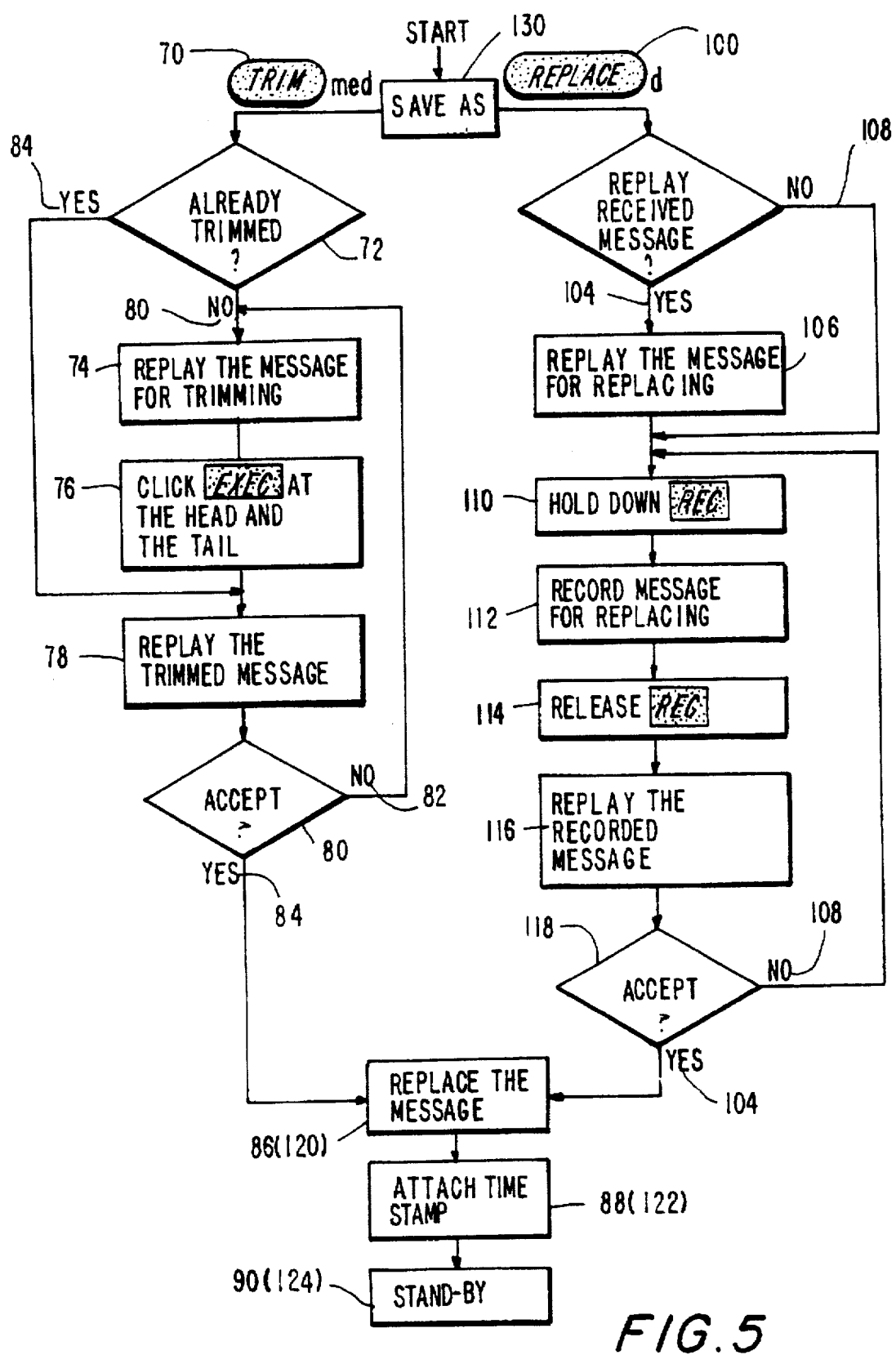
FIG. 5 is a flowchart of operations to be had in performing dual message trimming and message replacement operations according to another embodiment of the present invention.

FIG. 5 represents a composite system incorporating both of the first and second operation modes described above relative to trimming a message in FIG. 3 or replacing a message in FIG. 4. Thus, upon starting this operational dual mode, the user is presented with the decision to save as a trimmed message or save as a replaced message, as represented as decision 130 in FIG. 5. In the event the trimmed message is selected, the trim button 70 is pressed and the operations performed as described relative to FIG. 3. On the other hand, if it is desired by the user to replace the recorded message, the replace button 100 is pressed and the operations shown in FIG. 4 are performed. In both events, at the conclusion of the trimming or replacing operation, the message is replaced at step 86 (120), a time stamp attached at 88 (122) and the system reverted to the standby mode in step 90 (124).

Although different yes and no buttons are shown for the respective trimming and replacing operations the same pair of yes and no buttons could be commonly used for the two operations.

Figure 6:
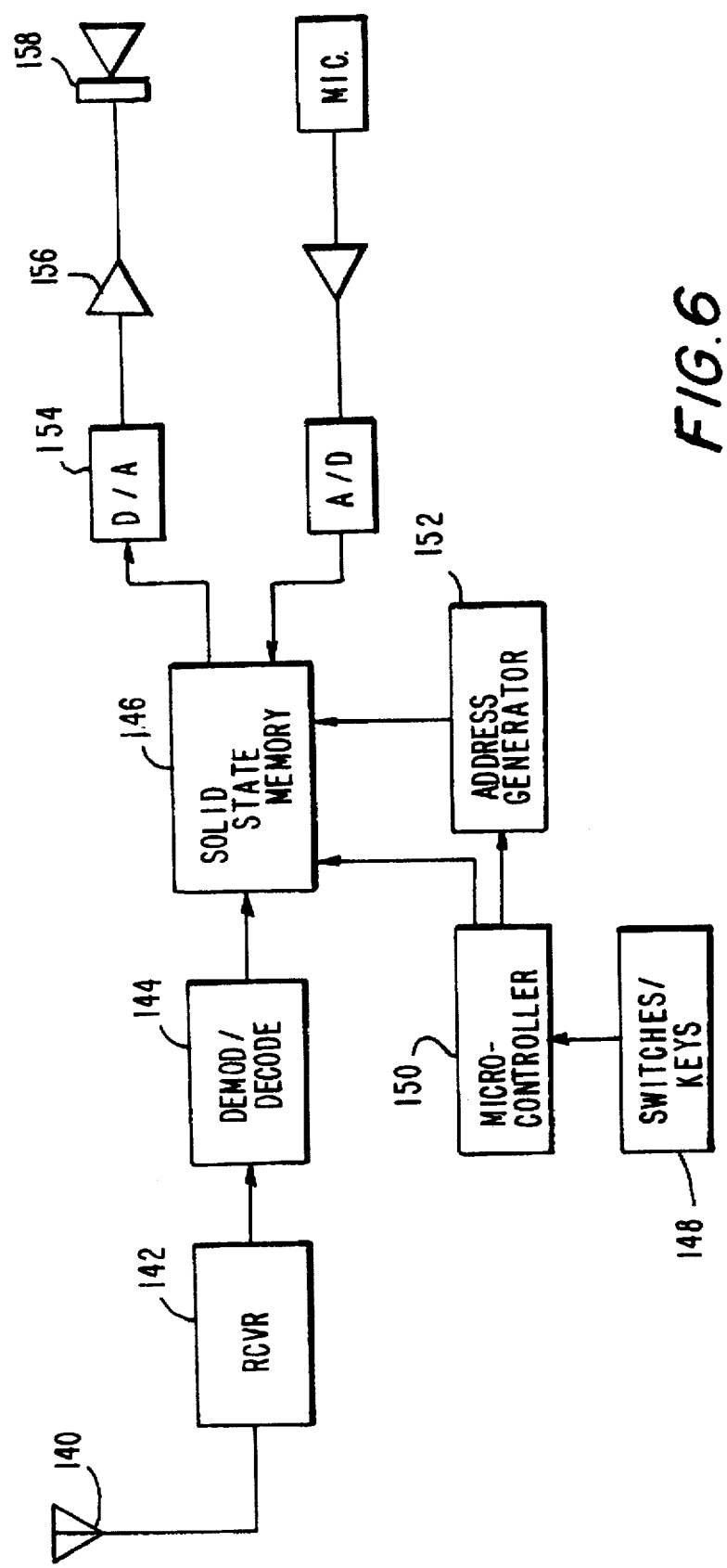
FIG. 6 is a block diagram of an overall system for use in performing operations shown in the flowchart of FIG. 5.

FIG. 6 is an overall block diagram of apparatus useful in practicing the above invention. Although the present invention is contemplated for use with a wireless voice messaging unit, only the receiving portion is shown in FIG. 6. In that regard, an incoming message signal is received on an antenna 140 by suitable receiver circuitry shown generally at 142 and decoded and demodulated in a decoder/demodulator 144 prior to being stored in a solid-state, semiconductor memory 146. As described above, relative to FIGS. 3–5, various switches and operating keys are provided to be pressed by the user and those switches are shown generally at 148. These switches 148 control a microcontroller 150 that provides commands to the memory 46 and also instructs an address generator to read/write the message in the solid-state memory 146.

Thus, upon practicing the trimming method, the user operates the appropriate one of the switches 148 causing the micro-controller 150 to read out the appropriate message from memory 146 and that digital memory content is passed through a digital-to-analog convertor 154 whose output is amplified in amplifier 156 and played back over a loudspeaker or earphone or the like 158. The user then presses the execute key EXEC that is included in the switches 148 at the beginning and end points. The trimmed message is then played back again over the loudspeaker 158 and upon accepting it, it is used to replace the originally recorded message in the memory 146.

Similarly, upon the user actuating the record key REC that is one of the switches and keys 148, the microcontroller 150 controls the address generator 152 and memory 146 to accept an input recording signal as recorded by microphone 160, amplifier 162, and analog-to-digital convertor 164, so that the replacement message is recorded in the solid-state memory 146. Upon actuating the YES button, the microcontroller 150 then causes the address generator 152 and the memory 146 to replace the originally stored message with the replacement message, as represented in FIG. 2C, for example.

Although the present invention has been described hereinabove with reference to the preferred embodiments, it is to be understood that the invention is not limited to such illustrative embodiments alone, and various modifications may be contrived without departing from the spirit or essential characteristics thereof, which are to be determined solely from the appended claims.

What is claimed is:

1. A method for performance by a user of a wireless voice messaging unit having a solid-state memory with incoming messages stored therein, the method comprising steps of:

determining whether a stored message has already been subjected to trimming by checking for the presence of a beginning flag;

if the stored message is trimmed, replaying the trimmed message;

determining whether the trimmed message is acceptable;

if the message is not trimmed, replaying the stored incoming message for audition by the user of the wireless voice messaging unit;

marking in the memory a trimming beginning point and a trimming ending point of the stored message during playback thereof;

replaying a trimmed message defined by the trimming beginning point and the trimming ending point of the stored message;

determining whether the replayed trimmed message is acceptable; and upon determining an acceptable trimmed message replacing the stored message with the trimmed message in the solid-state memory.

2. The method according to claim 1, wherein the step of marking includes setting a beginning flag and an ending flag in the solid-state memory.

3. The method according to claim 1, comprising the further step of after the step of replacing setting the unit in a standby mode to receive and store additional incoming messages.

4. The method according to claim 1, comprising the further steps of:

marking in the memory a second trimming beginning point and a second trimming ending point of the stored message and forming a second trimmed message;

replaying the second trimmed message;

determining whether the second trimmed message is acceptable; and upon determining an acceptable second trimmed message storing the second trimmed message in the solid-state memory.

5. A method with performance by a user of a wireless voice messaging unit having a solid-state memory with incoming messages stored therein, the method comprising steps of:

determining whether a stored incoming message needs to be replayed;

if the stored incoming message does not need to be replayed, creating a replacement message shorter in length than the stored incoming message and including information contained in the stored message;

if the stored incoming message needs to be replayed, replaying the stored incoming message for audition by the user of the wireless voice messaging unit;

creating the replacement message shorter in length than the stored incoming message that was replayed and including information contained in the stored message;

recording the replacement message by storing the replacement message in the solid-state memory;

replaying the recorded replacement message from the solid-state memory;

determining whether the replayed replacement message is acceptable; and upon determining an acceptable replacement message replacing the stored message with the replacement message in the solid-state memory.

6. The method according to claim 5, comprising the further step of after the step of replacing setting the unit in a standby mode to receive and store additional incoming messages.

7. Apparatus for storing messages in a wireless voice messaging unit, the apparatus comprising:

means for receiving an incoming message;

a solid-state semiconductor memory for storing the received incoming message therein;

means connected to said memory for reading out a stored message from said memory and reproducing the incoming message for audition by a user of the wireless voice messaging unit;

switch means for marking in said memory a trimming beginning point and a trimming ending point of the stored message and forming a trimmed message as a portion of the stored message; and means connected to said memory and said switch means for replacing in said memory said stored message by said trimmed message.

8. The apparatus according to claim 7, wherein said means for replacing comprises a microcontroller connected to said switch means and an address generator connected to said memory, whereby upon actuating said switch means said microcontroller writes the trimmed message into said memory at addresses set by said address generator.

9. The apparatus according to claim 7, wherein said means for reading out and reproducing the incoming message include a digital-to-analog converter connected to an output of said memory for producing an analog signal for audition by the user.

10. The apparatus according to claim 7, further comprising:

voice input means connected to said memory for storing in said memory a replacement message created by the user.

11. The apparatus according to claim 10, wherein said voice input means includes a microphone and an analog-to-digital converter for converting an analog voice signal from said microphone to a digital signal for storage in said memory.

12. The apparatus according to claim 11, wherein said means for replacing comprises a microcontroller connected to said switch means and an address generator connected to said memory, whereby upon actuating said switch means said microcontroller writes the trimmed message into said memory at addresses set by said address generator.

13. The apparatus according to claim 12, wherein said means for reading out and reproducing the incoming message include a digital-to-analog converter connected to an output of said memory for producing an analog signal for audition by the user.

* * * * *